US 6,617,037 B2

(12) United States Patent
Sun et al.

(10) Patent No.: US 6,617,037 B2
(45) Date of Patent: *Sep. 9, 2003

(54) SILICON BASED SUBSTRATE WITH A CTE COMPATIBLE LAYER ON THE SUBSTRATE

(75) Inventors: Ellen Y. Sun, South Windsor, CT (US); Harry E. Eaton, Woodstock, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/034,677

(22) Filed: Dec. 19, 2001

(65) Prior Publication Data

US 2003/0113553 A1 Jun. 19, 2003

(51) Int. Cl.⁷ .............................. B32B 9/04; F03B 3/12
(52) U.S. Cl. ........................ 428/446; 428/697; 428/698; 428/699; 428/701; 428/702; 428/448; 416/241 B
(58) Field of Search .................................. 428/469, 408, 428/697, 698, 699, 701, 702, 446, 448, 660, 680, 681; 416/241 R, 241 B

(56) References Cited

U.S. PATENT DOCUMENTS 6,296,941 B1 * 10/2001 Eaton et al.
6,485,848 B1 * 11/2002 Wang et al.

FOREIGN PATENT DOCUMENTS

WO    WO 01/10795 A1    2/2001

* cited by examiner

*Primary Examiner*—Deborah Jones
*Assistant Examiner*—Jennifer McNeil
(74) *Attorney, Agent, or Firm*—Bachman & LaPointe, P.C.

(57) ABSTRACT

An article comprising a substrate containing silicon and at least one layer which contains a coefficient of thermal expansion (CTE) tailoring additive in an amount sufficient to maintain a compatible CTE with at least one adjacent layer and the substrate.

18 Claims, No Drawings

SILICON BASED SUBSTRATE WITH A CTE COMPATIBLE LAYER ON THE SUBSTRATE

BACKGROUND OF THE INVENTION

The present invention relates to an article comprising a substrate containing silicon and at least one layer and, more particularly, a layer which contains a coefficient of thermal expansion (CTE) tailoring additive in an amount sufficient to maintain a compatible CTE with at least one adjacent layer and the substrate.

Ceramic materials containing silicon and metal alloys containing silicon have been proposed for structures used in high temperature applications as, for example, gas turbine engines, heat exchangers, internal combustion engines, and the like. A particular useful application for these materials is for use in gas turbine engines which operate at high temperatures in aqueous environments. It has been found that these silicon containing substrates can recede and lose mass as a result of a formation volatile Si species, particularly $Si(OH)_x$ and SiO when exposed to high temperature, aqueous environments. For example, silicon carbide when exposed to a lean fuel environment of approximately 1 ATM pressure of water vapor at 1200° C. will exhibit weight loss and recession at a rate of approximately 6 mils per 1000 hrs.

It is not uncommon to use one or more layers on a substrate such as barrier layers, bond layers, intermediate layers, and the like. It is important for the integrity of the final article to maintain a compatibility between the coefficient of thermal expansion (CTE) of the silicon containing substrate and adjacent layers and between adjacent layers themselves. If the CTE between adjacent layers and substrate are not compatible, the overall coating can break down at the interfaces between the non-compatible layers.

Accordingly, it is a principle object of the present invention to provide an article comprising the silicon containing substrate and at least one layer wherein the layer has a coefficient of thermal expansion which is compatible with the substrate when adjacent to the substrate and compatible with any other adjacent layer(s).

Further objects and advantages of the present invention will appear hereinbelow.

SUMMARY OF THE INVENTION

The CTE tailoring addition of the present invention may be used in any one or more layers (barrier layers, bond layers, intermediate layers, etc.) on a silicon containing substrate. The invention will be described with reference to barrier layers containing the CTE additive. In accordance therewith, an article comprises a silicon containing substrate having at least one layer, for example a barrier layer, wherein the barrier layer functions to both inhibit the formation of undesirable gaseous species of silicon when the article is exposed to a high temperature, aqueous environment and to provide thermal protection. By high temperatures is meant the temperature at which the Si in the substrate forms $Si(OH)_x$ and/or SiO in an aqueous environment. By aqueous environment is meant a water and/or steam environment. The silicon containing composite is preferably a ceramic or metal alloy containing silicon, The external barrier layer is characterized by a coefficient of thermal expansion which is within plus or minus 3.0 ppm per degree centigrade of the coefficient of thermal expansion (CTE) of the silicon containing substrate and/or any adjacent barrier layer. The CTE compatibility is accomplished by providing a CTE tailoring additive in the barrier layer in an amount sufficient to maintain the desired CTE compatibility. $NbO_x$ (where x=1 to 3 and is a ratio of O to the compound element, see U.S. Pat. No. 4,155,016) is, in accordance with the present invention, one suitable CTE tailoring additive. A further CTE tailoring additive in accordance with the present invention comprises $NbO_x$ and an oxide selected from the group consisting of MgO, CaO, SrO, BaO, $Ta_2O_5$, $Al_2O_3$, $Y_2O_3$, $La_2O_3$, $Re2O_3$ (wherein Re is a rare earth element) and mixtures thereof, and this may also serve as the entire barrier layer if desired. The CTE tailoring additives described above may also be added to any known barrier layer or other layers used in combination on the substrate. Particularly useful barrier layers for use with the CTE tailoring additive include barrier layers selected from the group consisting of alkaline earth aluminosilicates, aluminum silicates, yttrium silicates, yttrium aluminosilicates, rare earth aluminosilicates, and oxides of aluminium, yttrium, magnesium, calcium, strontium, barium, tantalum, lanthanum, rare earth oxides, and mixtures thereof. The article can include one or more intermediate layers between the silicon based substrate and the barrier layer. The intermediate layer(s) serve(s) to provide enhanced adherence between the barrier layer and the substrate and/or to prevent reactions between the barrier layer and the substrate. In addition, bond layers and top layers may be included as is known in the art.

DETAILED DESCRIPTION

The present invention relates to an article comprising a silicon containing substrate and at least one layer, wherein the layer comprises a coefficient of thermal expansion (CTE) tailoring additive in an amount sufficient to maintain a compatible CTE with at least one of an adjacent layer and substrate.

According to the present invention, the silicon containing substrate may be a silicon containing ceramic substrate or a silicon containing metal alloy. In a preferred embodiment, the silicon containing substrate is a silicon containing ceramic material as, for example, silicon carbide, silicon nitride, silicon carbon nitride, silicon oxynitride and silicon aluminum oxynitride. In accordance with a particular embodiment of the present invention, the silicon containing ceramic substrate comprises a silicon containing matrix with reinforcing such as fibers, particles, and the like and, more particularly, a silicon carbide coated silicon carbide fiber-reinforced silicon carbide particle and silicon matrix, a carbon fiber-reinforced silicon carbide matrix and a silicon carbide fiber-reinforced silicon nitride matrix. Particularly useful silicon-metal alloys for use as substrates for the article of the present invention include molybdenum-silicon alloys, niobium-silicon alloys, and other Si containing alloys having a coefficient of thermal expansion compatible with the barrier layer of the present invention.

The CTE tailoring additive is selected from the group consisting of $NbO_x$ and $NbO_x$ plus an oxide selected from the group consisting of MgO, CaO, SrO, BaO, $Ta_2O_5$, $Al_2O_3$, $Y_2O_3$, $La_2O_3$, rare earth oxides and mixtures thereof where x=1 to 3 (for example NbO, $NbO_2$, $Nb_2O_3$, $Nb_2O_5$). When the additive comprises $NbO_x$ with an oxide as set forth above, it may comprise the layer per se. In accordance with a preferred embodiment of the present invention, the CTE tailoring additive is added to a layer material for adjusting the CTE of the layer so as to make the layer compatible with the substrate and any other adjacent layers which may be employed.

Barrier layers, which are particularly useful in the article of the present invention, to which the CTE tailoring additive is added include alkaline earth aluminosilicates, aluminum silicates, yttrium silicates, yttrium aluminosilicates, rare earth aluminosilicates, and oxides of aluminum, yttrium, magnesium, calcium, strontium, barium, lanthanum, rare earth oxides, and mixtures thereof. Particularly useful barrier layers include niobates of the formula a(alkaline earth metal oxide).b($NbO_x$) where x=1 to 3 and b=1/3a to 3a, $NbO_x$ in an amount of 1 to 75 wt. % to an oxide selected from the group consisting of MgO, CaO, SrO, BaO, $Al_2O_3$, $Y_2O_3$, $L_2O_3$, rare earth oxides and mixtures thereof where x=1 to 3 (for example NbO, $NbO_2$, $Nb_2O_3$, $Nb_2O_5$), particularly $Nb_2O_5.Al_2O_3$ and $2BaO.2SrO.3Nb_2O_5$. Other preferred barrier layers include the CTE tailoring additive to a level of 1 to 75 wt. % with an alkaline earth aluminosilicate such as strontium aluminosilicate and/or barium strontium aluminosilicate.

The CTE tailoring additive should be present in the layer in an amount sufficient to maintain compatibility between itself and adjacent layers and the substrate. When $NbO_x$ is added, for example to a barrier layer described above, it should be present in an amount of at least 5 wt. %, preferably between 20 wt. % and 80 wt. %, ideally between 50 and 80 wt. %. If the CTE additive comprises $NbO_x$ plus an oxide, it should be present in an amount of at least 20 wt. %, preferably between 20 wt. % and 80 wt. %, ideally between 50 and 80 wt. %. If the layer comprises $NbO_x$ plus the oxide per se, then the $NbO_x$ should be present in an amount of at least 5 wt. %, preferably 10 wt. % to 90 wt. %, ideally between 50 and 80 wt. %. The critical feature is the presence of the CTE additive in amounts sufficient to provide the compatibility set forth below.

It is an important feature of the present invention to maintain compatibility between the coefficient of thermal expansion of the silicon containing substrate and the layer and/or adjacent layers. In accordance with the present invention it has been found that the coefficient of thermal expansion of the layer should be within ±3.0 ppm per degrees centigrade, preferably ±1.0 ppm per degrees centigrade, and ideally 0.5 ppm/° C., of the coefficient of thermal expansion of the silicon containing substrate and/or adjacent layers.

The layers should be present in the article at a thickness of greater than or equal to about 0.5 mils (0.0005 inch), preferably between about 3 to about 30 mils and ideally between about 3 to about 5 mils. The layers may be applied to the silicon based substrate by any suitable manner known in the art, however, it is preferable that the layers be applied by thermal spraying.

In a further embodiment of the article of the present invention, one or more intermediate layers can be provided between the silicon containing substrate and a barrier layer. The intermediate layer(s) serve(s) to provide enhanced adhesion between the barrier layer and the substrate and/or to prevent reactions between the barrier layer and the substrate. The one or more intermediate layers will contain, if necessary, the CTE tailoring additive in order to insure compatibility between adjacent layers. In this way an article is produced wherein CTE compatibility is insured regardless of whether there is a great degree of CTE incompatibility between the substrate and any preferred functional barrier layer by employing tailored intermediate barrier layers which bridge the CTE from the substrate to the, for example, top barrier layer. The thickness of the intermediate layer is typical to those described above with regard to the barrier layer and the intermediate layer may likewise be disposed in any manner known in the prior art.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. An article comprising:
   a substrate comprising silicon; and
   at least one layer, wherein the least one layer contains a coefficient of thermal expansion (CTE) tailoring additive in an amount sufficient to maintain a compatible CTE with the substrate wherein the CTE tailoring additive is selected from the group consisting of $NbO_x$ and $NbO_x$ plus an oxide selected from the group consisting of MgO, CaO, SrO, BaO, $Ta_2O_5$, $Al_2O_3$, $Y_2O_3$, $La_2O_3$, rare earth oxides and mixtures thereof where x=1 to 3 and, wherein said layer comprises up to 80 wt. % of said CTE tailoring additive.

2. An article according to claim 1 wherein the layer is selected from the group consisting of alkaline earth aluminosilicates, aluminum silicate, yttrium silicates, yttrium aluminosilicates, rare earth aluminosilicates, oxides of tantalum, aluminum, yttrium, magnesium, calcium, strontium, barium, lanthanum, rare earth oxides, and mixtures thereof.

3. An article according to claim 1 wherein said layer comprises between 20 to 80 wt. % of said CTE tailoring additive.

4. An article according to claim 1 wherein the coefficient of thermal expansion of the layer is within ±1.0 ppm/° C. the coefficient of thermal expansion of the substrate.

5. An article according to claim 1 wherein the coefficient of thermal expansion of the layer is within ±0.5 ppm/° C. the coefficient of thermal expansion of the substrate.

6. An article comprising:
   a substrate comprising silicon; and
   at least one layer, wherein the layer comprises $NbO_x$ (where x=1 to 3) and an oxide selected from the group consisting of MgO, CaO, SrO, BaO, $Ta_2O_5$, $Al_2O_3$, $Y_2O_2$, $La_2O_3$ and mixtures thereof wherein the least one layer maintains a compatible CTE with the substrate.

7. An article according to claim 1 or 6 wherein the layer is selected from the group consisting of $Nb_2O_5.Al_2O_3$ and $2BaO.2 SrO.3Nb_2O_5$.

8. An article comprising:
   a substrate comprising silicon; and
   at least one layer, wherein the layer is selected from the group consisting of $Nb_2O_5.Al_2O_3$ and $2 BaO.2SrO.3Nb_2O_5$ wherein the least one layer has a coefficient of thermal expansion (CTE) which is compatible with the coefficient of thermal expansion of the substrate.

9. An article according to claim 1, 6 or 8 wherein the substrate is selected from the group consisting of silicon containing ceramic and metal alloys containing silicon.

10. An article according to claim 9 wherein the substrate is a silicon containing ceramic selected from the group consisting of silicon carbide, silicon nitride, and silicon aluminum oxynitride.

11. An article according to claim 9 wherein the substrate is a composite comprising a silicon based matrix and a reinforcing particle.

12. An article according to claim 11 wherein said substrate is selected from the group consisting of silicon carbide fiber-reinforced silicon carbide matrix, carbon fiber-reinforced silicon carbide matrix and silicon carbide fiber-reinforced silicon nitride.

13. An article according to claim 9 wherein said substrate is a silicon containing metal alloy selected from the group consisting of molybdenum-silicon alloys, niobium silicon alloys, iron-silicon alloys, and iron-nickel-silicon based alloys.

14. An article according to claim 1, 6 or 8 including an intermediate layer between the substrate and the layer.

15. An article according to claim 14 wherein the intermediate layer contains a CTE tailoring additive.

16. An article according to claim 15 wherein said CTE tailoring additive of the intermediate layer is selected from the group consisting of $NbO_x$ and $NbO_x$ plus an oxide selected from the group consisting of MgO, CaO, SrO, BaO, $Al_2O_3$, $Ta_2O_5$, $Y_2O_3$, $La_2O_3$, rare earth oxides and mixtures thereof where x=1 to 3.

17. An article according to claim 5 wherein the coefficient of thermal expansion of the intermediate layer is within ±1.0 ppm/° C. the coefficient of thermal expansion of the substrate and the layer.

18. An article according to claim 15 wherein the coefficient of thermal expansion of the intermediate layer is within ±0.5 ppm/° C. the coefficient of thermal expansion of the substrate and the layer.

* * * * *

UNITED STATES PATENT AND TRADEMARK OFFICE
CERTIFICATE OF CORRECTION

PATENT NO.      : 6,617,037 B2
DATED           : September 9, 2003
INVENTOR(S)     : Ellen Y Sun et al.

It is certified that error appears in the above-identified patent and that said Letters Patent is hereby corrected as shown below:

Column 1,
After the title and before "BACKGROUND OF THE INVENTION", please insert the following:

U.S. GOVERNMENT RIGHTS

The invention was made with U.S. Government support under contract NAS3-98005 awarded by NASA. The U.S. Government has certain rights in the invention.

Column 4,
Line 6, please change "$Y_2O_2$" to read -- $Y_2O_3$ --.

Column 6,
Line 1, change the dependency from "5" to -- 15 --.

Signed and Sealed this

Twentieth Day of January, 2004

JON W. DUDAS
*Acting Director of the United States Patent and Trademark Office*